United States Patent
Webb

(10) Patent No.: US 11,753,149 B2
(45) Date of Patent: Sep. 12, 2023

(54) LANDING GEAR DOOR SYSTEM FOR A LANDING GEAR COMPARTMENT

(71) Applicant: The Boeing Company, Chicago, IL (US)

(72) Inventor: Sean C. Webb, Charleston, SC (US)

(73) Assignee: The Boeing Company, Chicago, IL (US)

( * ) Notice: Subject to any disclaimer, the term of this patent is extended or adjusted under 35 U.S.C. 154(b) by 6 days.

(21) Appl. No.: 17/541,181

(22) Filed: Dec. 2, 2021

(65) Prior Publication Data

US 2022/0219811 A1 Jul. 14, 2022

Related U.S. Application Data

(60) Provisional application No. 63/135,294, filed on Jan. 8, 2021.

(51) Int. Cl.
*B64C 25/16* (2006.01)

(52) U.S. Cl.
CPC .................... *B64C 25/16* (2013.01)

(58) Field of Classification Search
CPC .......... B64C 25/16; B64C 25/18; B64C 25/20
See application file for complete search history.

(56) References Cited

U.S. PATENT DOCUMENTS

| | | | |
|---|---|---|---|
| 2,457,625 A | 12/1948 | Amiot | |
| 7,178,759 B2 | 2/2007 | Rouyre | |
| 7,458,542 B2 | 12/2008 | Chow et al. | |
| 2005/0211849 A1* | 9/2005 | Rouyre | B64C 25/16 244/129.4 |
| 2015/0151832 A1* | 6/2015 | Filho | B64C 25/16 244/102 R |
| 2017/0073063 A1* | 3/2017 | Filho | B64C 25/16 |

FOREIGN PATENT DOCUMENTS

| | | |
|---|---|---|
| CA | 2945967 A1 | 4/2018 |
| CN | 113815843 A * | 12/2021 |

* cited by examiner

*Primary Examiner* — Richard G Davis
(74) *Attorney, Agent, or Firm* — Quinn IP Law

(57) ABSTRACT

A landing gear door system for a landing gear compartment includes a door pivotable about a pivot pin configured for disposition in a longitudinal direction on an airframe, and a mechanism configured to rotate the door about the pivot pin between a closed position, in which an outer surface of the door panel is configured to provide aerodynamic continuity with an outer aircraft skin of the airframe, and an open position, in which the door is rotated into the landing gear compartment and an opening is exposed. The door has a door panel rigidly connected with an arm such that the door panel and arm generally form a V-shape as viewed in the longitudinal direction.

20 Claims, 5 Drawing Sheets

LANDING GEAR DOOR SYSTEM FOR A LANDING GEAR COMPARTMENT

CROSS-REFERENCE TO RELATED APPLICATION

The present application claims the benefit of priority to the U.S. Provisional Application No. 63/135,294 filed Jan. 8, 2021, which is hereby incorporated by reference in its entirety.

INTRODUCTION

This disclosure relates to landing gear door systems for the landing gear compartment of an aircraft.

Traditional nose landing gear for an aircraft may either be fixed or retractable. Fixed landing gear designs are simpler, but the protrusion of the landing gear into the airstream during flight causes undesirable drag, turbulence and vibration which compromises flight dynamics and imposes stress and wear upon the landing gear. On the other hand, retractable landing gear may be retracted into the nose or fuselage after takeoff, thus avoiding the exposure of the landing gear to the airstream during flight. Furthermore, once the nose landing gear is retracted, the aperture through which the landing gear is retracted is typically covered by one or more hinged doors whose outer surface closely matches the shape and curvature of the surrounding fuselage. However, such retractable nose landing gear systems typically require egress deployment of the one or more doors when the landing gear is extended for landing. This means the one or more doors are opened outward from the fuselage, and thus into the airstream. Similar to the fixed landing gear designs, this exposure of the egress doors to the high-speed airstream causes undesirable drag, turbulence and vibration which compromises flight dynamics and imposes stress and wear upon the egress doors.

SUMMARY

According to one embodiment, a landing gear door system for a landing gear compartment includes a door pivotable about a pivot pin configured for disposition in a longitudinal direction on an airframe, the door having a door panel rigidly connected with an arm such that the door panel and arm generally form a V-shape as viewed in the longitudinal direction, and a mechanism configured to rotate the door about the pivot pin between a closed position, in which an outer surface of the door panel is configured to provide aerodynamic continuity with an outer aircraft skin of the airframe, and an open position, in which the door is rotated into the landing gear compartment and an opening is exposed.

The door panel and arm may be rigidly connected with each other at a vertex portion of the door, with the pivot pin extending through the vertex portion. The pivot pin may be configured for rotatable connection with one of the outer aircraft skin and a mounting structure within the landing gear compartment. The door panel may have an arcuate profile as viewed in the longitudinal direction so as to provide the aerodynamic continuity with the outer aircraft skin in the closed position, and the arm may have a curved or bent profile as viewed in the longitudinal direction, wherein the curved or bent profile has an apex which extends away from the door panel.

The mechanism may be configured for mounting within the landing gear compartment. The mechanism may include: a connecting member having opposed first and second connecting member ends, wherein the first connecting member end is pivotably connected to the arm; a linkage having opposed first and second linkage ends, wherein the first linkage end is pivotably connected to the second connecting member end; a lever having opposed first and second lever ends and a fulcrum point between the first and second lever ends, wherein the first lever end is pivotably connected to the second linkage end and the fulcrum point is configured for rotatable connection with a first mounting point within the landing gear compartment; and an actuator rotatably connected to the second lever end and configured for selectively urging the second lever end in a first direction toward the opening and in a second direction away from the opening.

At least one of the connecting member, the linkage, and a portion of the lever between the fulcrum point and the second lever end may be configured to extend and retract in length. The landing gear door system may further include a strut having opposed first and second strut ends, wherein the first strut end is pivotably connected to the first linkage end and the second connecting member end, and the second strut end is pivotably connected to one of a second mounting point within the landing gear compartment and the outer aircraft skin. The strut may be configured to extend and retract in length, and the strut may include a strut extender configured for selectively urging or allowing the strut to extend and retract in length. The first lever end and the second linkage end may define a first joint therebetween, the first linkage end and the second connecting member end may define a second joint therebetween, and the first connecting member end and the arm may define a third joint therebetween, wherein when the first and second joints and the pivot pin are disposed along a substantially straight line, the third joint is disposed outboard of the substantially straight line.

According to another embodiment, a nose landing gear door system for a nose landing gear compartment includes: a door pivotable about a pivot pin configured for disposition in a longitudinal direction on an airframe, the door having a door panel rigidly connected with an arm such that the door panel and arm generally form a V-shape as viewed in the longitudinal direction; and a mechanism configured for mounting within the nose landing gear compartment and configured to rotate the door about the pivot pin between a closed position, in which an outer surface of the door panel is configured to provide aerodynamic continuity with an outer aircraft skin of the airframe, and an open position, in which the door is rotated into the nose landing gear compartment and an opening is exposed. The mechanism includes: a connecting member having opposed first and second connecting member ends, wherein the first connecting member end is pivotably connected to the arm; a linkage having opposed first and second linkage ends, wherein the first linkage end is pivotably connected to the second connecting member end; a lever having opposed first and second lever ends and a fulcrum point between the first and second lever ends, wherein the first lever end is pivotably connected to the second linkage end and the fulcrum point is configured for rotatable connection with a first mounting point within the nose landing gear compartment; and an actuator rotatably connected to the second lever end and configured for selectively urging the second lever end in a first direction toward the opening and in a second direction away from the opening.

At least one of the connecting member, the linkage, and a portion of the lever between the fulcrum point and the second lever end may be configured to extend and retract in length. The nose landing gear door system may further include a strut having opposed first and second strut ends, wherein the first strut end is pivotably connected to the first linkage end and the second connecting member end, and the second strut end is pivotably connected to one of a second mounting point within the nose landing gear compartment and the outer aircraft skin. The strut may include a strut extender configured for selectively urging or allowing the strut to extend and retract in length. The first lever end and the second linkage end may define a first joint therebetween, the first linkage end and the second connecting member end may define a second joint therebetween, and the first connecting member end and the arm may define a third joint therebetween, wherein when the first and second joints and the pivot pin are disposed along a substantially straight line, the third joint is disposed outboard of the substantially straight line.

According to yet another embodiment, a nose landing gear door system for an aircraft includes: (a) an airframe having a nose landing gear compartment surrounded by an outer aircraft skin; (b) a door pivotable about a pivot pin disposed in a longitudinal direction on the airframe, the door having a door panel rigidly connected with an arm such that the door panel and arm generally form a V-shape as viewed in the longitudinal direction; and (c) a mechanism mounted within the nose landing gear compartment and configured to rotate the door about the pivot pin between a closed position, in which an outer surface of the door panel is configured to provide aerodynamic continuity with the outer aircraft skin of the airframe, and an open position, in which the door is rotated into the nose landing gear compartment and an opening is exposed. In this embodiment, the mechanism includes: (i) a connecting member having opposed first and second connecting member ends, wherein the first connecting member end is pivotably connected to the arm; (ii) a linkage having opposed first and second linkage ends, wherein the first linkage end is pivotably connected to the second connecting member end; (iii) a lever having opposed first and second lever ends and a fulcrum point between the first and second lever ends, wherein the first lever end is pivotably connected to the second linkage end and the fulcrum point is rotatably connected with a first mounting point within the nose landing gear compartment; and (iv) an actuator rotatably connected to the second lever end and configured for selectively urging the second lever end in a first direction toward the opening and in a second direction away from the opening.

In this embodiment, the nose landing gear door system may further include a strut having opposed first and second strut ends, wherein the first strut end is pivotably connected to the first linkage end and the second connecting member end, and the second strut end is pivotably connected to one of a second mounting point within the nose landing gear compartment and the outer aircraft skin. Also in this embodiment, the first lever end and the second linkage end may define a first joint therebetween, the first linkage end and the second connecting member end may define a second joint therebetween, and the first connecting member end and the arm may define a third joint therebetween, wherein when the first and second joints and the pivot pin are disposed along a substantially straight line, the third joint is disposed outboard of the substantially straight line.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
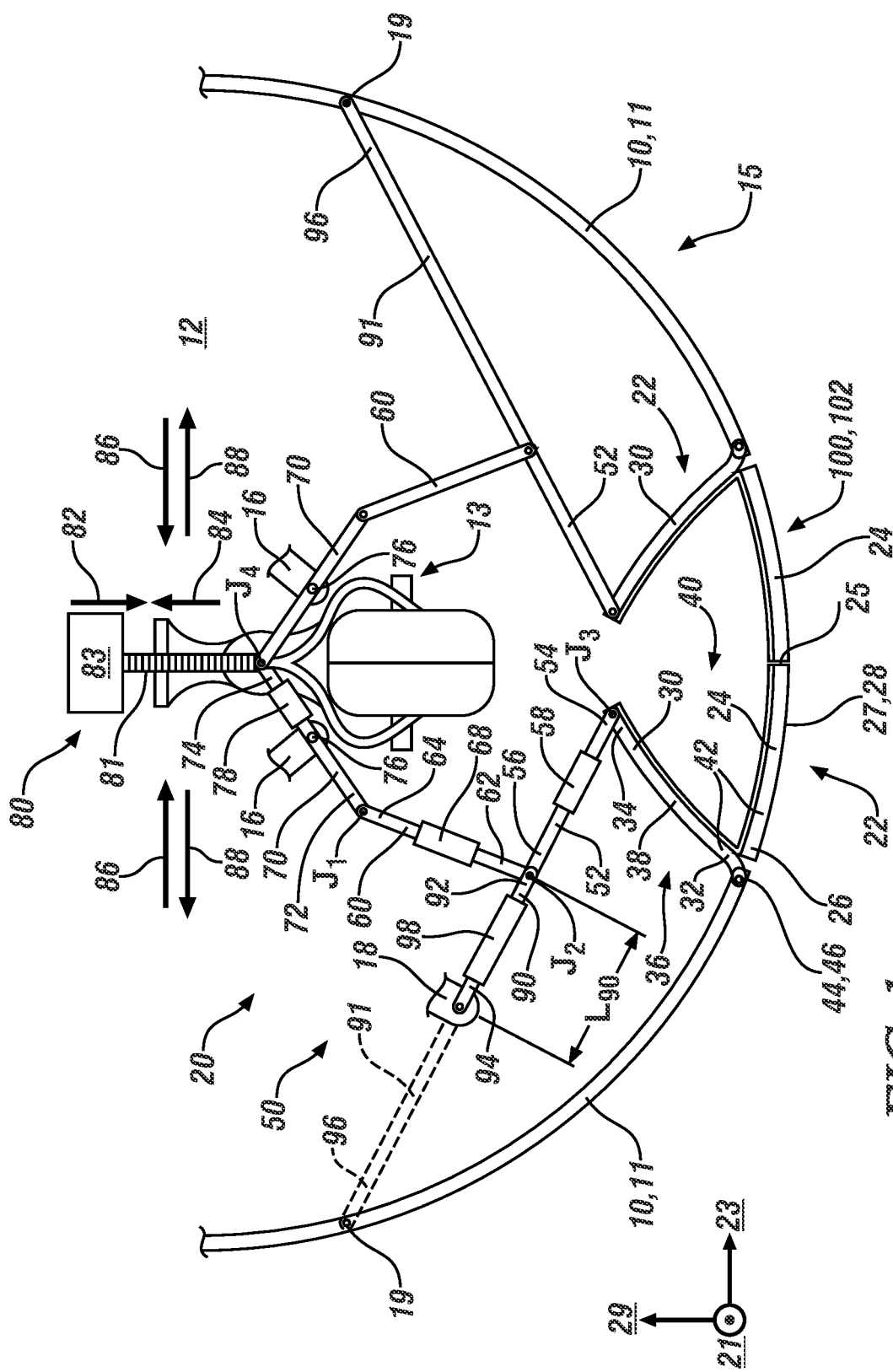
FIG. 1 is a schematic front view of a landing gear door system in a closed position.

Referring now to the drawings, wherein like numerals indicate like parts in the several views, a landing gear door system 20 for a landing gear compartment 12 (e.g., for an aircraft 15) is shown and described herein.

Figure 2:
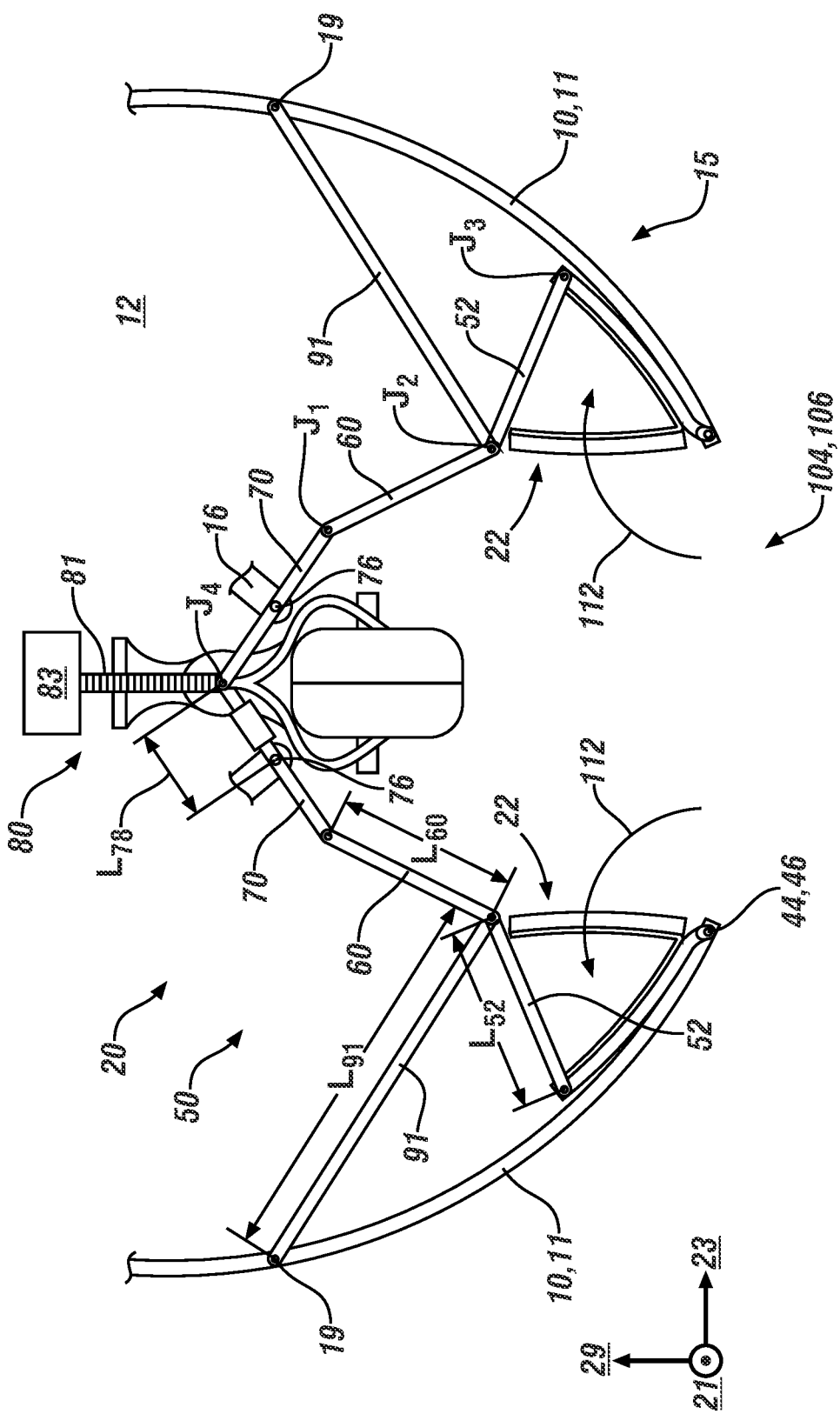
FIG. 2 is a schematic front view of a landing gear door system in an open position.
Figure 3:
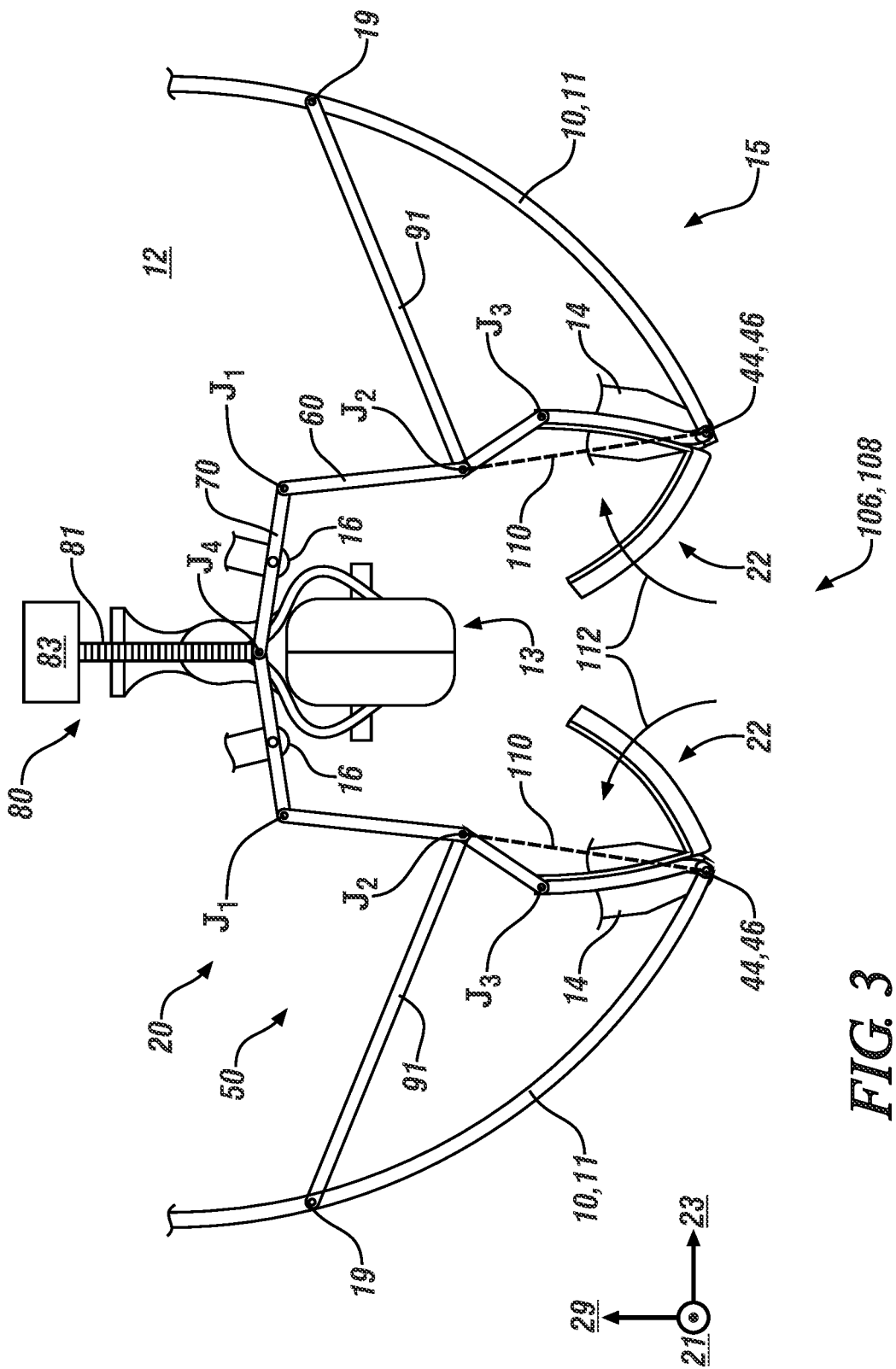
FIG. 3 is a schematic front view of a landing gear door system in an intermediate position.

FIGS. 1-3 show schematic front views of the landing gear door system 20 in a closed position 100, an open position 104, and an intermediate position 108, respectively. As further described below, FIG. 1 shows a first configuration using various extending/retracting portions 58, 68, 78, 98, while FIGS. 2-3 show a second configuration without such extending/retracting portions 58, 68, 78, 98.

Also shown in lower-left of each drawing is a reference showing a longitudinal direction 21 (represented by a circle with a "point" or dot in it, indicating that the positive longitudinal direction is pointed out of the plane of each drawing toward the viewer), a lateral direction 23 (represented by an arrow pointing to the right, indicating the positive or portward lateral direction), and a vertical direction 29 (represented by an arrow pointing upward, indicating the positive or upward vertical direction). Note that while the "point" and two arrows of this reference indicate the positive longitudinal, lateral and vertical directions 21, 23, 29, the opposite or negative directions are likewise implied (even though they are not explicitly shown). With respect to the conventional layout of a fixed-wing aircraft 15, the longitudinal direction 21 runs forward and rearward and is parallel to the roll axis, the lateral direction 23 runs to port and to starboard and is parallel to the pitch axis, and the vertical direction 29 runs upward and downward and is parallel to the yaw axis. Also shown at the top of FIG. 1 are downward and upward directions 82, 84 (parallel to the vertical direction 29), as well as inboard and outboard directions 86, 88.

While traditional nose landing gear door systems require egress deployment of one or more hinged doors, the landing gear door system 20 described herein provides the advantage of ingress deployment of one or more pivotable doors 22.

According to one embodiment, a landing gear door system 20 for a landing gear compartment 12 includes a door 22 pivotable about a pivot pin 44 configured for disposition in a longitudinal direction 21 on an airframe 10. (The pivot pin 44 pivots about a longitudinal axis 46, which runs parallel to the longitudinal direction 21.) The door 22 has a door panel 24 rigidly connected with an arm 30 such that the door panel 24 and arm 30 generally form a V-shape 40 as viewed in the longitudinal direction 21. The landing gear door system 20 also includes a mechanism 50 configured to rotate the door 22 about the pivot pin 44 (in the direction indicated by arrow 112) between (i) a closed position 100, in which an outer surface 27 of the door panel 24 is configured to provide aerodynamic continuity 102 with an outer aircraft skin 11 of the airframe 10, and (ii) an open position 104, in which the door 22 is rotated into the landing gear compartment 12 and an opening or aperture 106 is exposed.

The door 22 and/or door panel 24 may be configured such that, in the closed position 100, the contour of the door panel's outer surface 27 generally matches the adjacent and surrounding contour of the outer aircraft skin 11. In other words, with the door 22 disposed in the closed position 100, the outer aircraft skin 11 and outer surface 27 together provide a substantially smooth, uninterrupted combined surface which minimizes air drag across this surface. On the other hand, when the door 22 is disposed in the open position 104, an opening or aperture 106 is presented where the outer surface 27 was previously disposed.

The door panel 24 and arm 30 may be rigidly connected with each other at a vertex portion 42 of the door 22, with the pivot pin 44 extending through the vertex portion 42. The pivot pin 44 may be configured for rotatable connection with one of (i) the outer aircraft skin 11 and (ii) a mounting structure 14 within the landing gear compartment 12. The door panel 24 may be configured to have an arcuate profile 28 as viewed in the longitudinal direction 21 so as to provide the abovementioned aerodynamic continuity 102 with the outer aircraft skin 11 in the closed position 100. The arm 30 may have a curved or bent profile 36 as viewed in the longitudinal direction 21, wherein the curved or bent profile 36 has an apex 38 which extends away from the door panel 24.

The configurations shown in FIGS. 1-3 show two generally V-shaped doors 22 disposed in a mirror image arrangement with respect to each other. (Note, however, that the landing gear door system 20 may include only one door 22, rather than two.) Each door panel 24 includes opposed first and second edges 25, 26, and each arm 30 includes opposed first and second arm ends 32, 34, with the vertex portion 42 of each door 22 including the respective second edge 26 and first end 32. With the two-door configuration shown in the drawings, the first edges 25 of the two doors 22 may meet, abut and/or seal against each other in the closed position 100 such that a smooth surface and aerodynamic continuity 102 are provided thereat.

The mechanism 50 may be configured for mounting within the landing gear compartment 12. The mechanism 50 may include: (i) a connecting member 52 having opposed first and second connecting member ends 54, 56 with a connecting member length $L_{52}$ therebetween, wherein the first connecting member end 54 is pivotably connected to the arm 30; (ii) a linkage 60 having opposed first and second linkage ends 62, 64 with a linkage length $L_{60}$ therebetween, wherein the first linkage end 62 is pivotably connected to the second connecting member end 56; (iii) a lever 70 having opposed first and second lever ends 72, 74 and a fulcrum point 76 between the first and second lever ends 72, 74 (with a lever portion length $L_{78}$ between the second lever end 74 and the fulcrum point 76), wherein the first lever end 72 is pivotably connected to the second linkage end 64 and the fulcrum point 76 is configured for rotatable connection with a first mounting point 16 within the landing gear compartment 12; and (iv) an actuator 80 rotatably connected to the second lever end 74 and configured for selectively urging the second lever end 74 in a first direction 82 (e.g., downward) toward the opening 106 and in a second direction 84 (e.g., upward) away from the opening 106.

The actuator 80 may include a contact portion 81 which rotatably connects with the second lever end 74, and a drive portion 83 which selectively urges or drives the contact portion 81 in the first and second directions 82, 84. For example, the actuator 80 may be a linear actuator configured to selectively drive the second lever end 74 downward and upward. The drive portion 83 may be fixedly disposed within the landing gear compartment 12, while the contact portion 81 may be free to translate in the first and second directions 82, 84 (e.g., downward and upward).

At least one of the connecting member 52, the linkage 60, and a portion of the lever 70 between the fulcrum point 76 and the second lever end 74 may be configured to extend and retract in length. For example, the connecting member 52 may include a respective extending/retracting portion 58, the linkage 60 may include a respective extending/retracting portion 68, and/or the lever 70 (between the fulcrum point 76 and the second lever end 74) may include a respective extending/retracting portion 78. Each of these extending/retracting portions 58, 68, 78 may assume various configurations, such as shocks, dampers and the like whose extension/retraction is constrained to act only along the length of the respective connecting member 52, linkage 60 or lever 70.

The landing gear door system 20 may further include a strut 90, 91 having a first strut end 92, a second strut end 94, 96 opposed to the first strut end 92, and a length $L_{90}$, $L_{91}$ between the first strut end 92 and the second strut end 94, 96. The first strut end 92 may be pivotably connected to the first linkage end 62 and the second connecting member end 56, and the second strut end 94, 96 may be pivotably connected to one of (i) a second mounting point 18 within the landing gear compartment 12 and (ii) an alternative second mounting point 19 defined or carried by the outer aircraft skin 11 (e.g., on an interior or inboard surface of the outer aircraft skin 11). Note that FIG. 1 illustrates both of these possible connection arrangements for the second strut end 94, 96, utilizing a "short" strut 90 having a second strut end 94 shown on the left side of the drawing, and a "long" strut 91 having a second strut end 96 shown on the right side of the drawing. For example, the door 22 on the left side of the drawing has its second strut end 94 pivotably connected to a second mounting point 18 located within the landing gear compartment 12, while the door 22 on the right side of the drawing has its second strut end 96 pivotably connected to an alternative second mounting point 19 defined or carried by the outer aircraft skin 11. (The left side of the drawing also shows dashed lines representing the outline of a "long" strut 91, if such a strut 91 were used there instead of the "short" strut 90.)

Also note that like the connecting member 52, the linkage 60, and the portion of the lever 70 between the fulcrum point 76 and the second lever end 74, the strut 90, 91 may be configured to extend and retract in length $L_{90}$, $L_{91}$, and the strut 90, 91 may include a strut extender 98 (which may also be referred to as a strut extending/retracting portion 98) configured for selectively urging or allowing the strut 90, 91 to extend and retract in length $L_{90}$, $L_{91}$. As used here in the phrase "urging or allowing", "urging" means "actively acting or causing", while "allowing" means "passively letting or allowing". For example, a strut extender 98 may be configured so as to actively urge or cause the strut 90, 91 to selectively extend and retract in length $L_{90}$, $L_{91}$, such as by electrical, pneumatic, mechanical, magnetorheological or other actuation. (Note that such means of actuation are not illustrated in the drawings.) Or, the strut extender 98 may assume the form of a shock absorber, damper, telescoping arrangement, or the like which passively allows the strut 90, 91 to be extended and retracted in length $L_{90}$, $L_{91}$, such as by the action of forces from the first linkage end 62 and the second connecting member end 56, which are pivotably attached to the first strut end 92.

The first lever end 72 and the second linkage end 64 may define a first joint $J_1$ therebetween, the first linkage end 62 and the second connecting member end 56 may define a second joint $J_2$ therebetween, the first connecting member end 54 and the arm 30 may define a third joint $J_3$ therebetween, and the second lever end 74 and the contact portion 81 of the actuator 80 may define a fourth joint $J_4$. As illustrated in FIG. 3, the landing gear door system 20 may be configured such that when the first and second joints $J_1$, $J_2$ and the pivot pin 44 are disposed along a substantially straight line 110, the third joint $J_3$ is disposed outboard of (i.e., in an outboard direction 88 from) the substantially straight line 110.

In operation, the landing gear door system 20 may be disposed in the closed position 100 (FIG. 1) after the aircraft 15 has lifted off of the runway and the landing gear 13 has been retracted into the landing gear compartment 12. The landing gear door system 20 will typically remain in the closed position 102 during normal flight, so that the smooth outer aircraft skin 11 and outer surface 27 together provide aerodynamic continuity 102 and low drag. Then, just prior to landing, the landing gear door system 20 may be disposed in the open position 100 (FIG. 2) so that the landing gear 13 may be extended through the opening 106 for landing. The landing gear door system 20 may remain in the open position 100 during landing and taxiing, and indeed until the aircraft 15 takes off again. Note that each time the landing gear door system 20 transitions between the closed and open positions 100, 104, it also passes through a series of intermediate positions 108 (one example of which is shown in FIG. 3).

In order to cycle the landing gear door system 20 among the closed, intermediate and open positions 100, 108, 104, the actuator 80 may be selectively actuated to cause the contact portion 81 to move in the first and second directions 82, 84 (e.g., downward and upward) in a manner that causes the door 22 to rotate about its pivot pin 44. This rotation of the door 22 is effected by converting the linear motion of the actuator 80 into rotational motion of the door 22, via the series of fixed and movable connections between and among the actuator 80, the lever 70, the first mounting point 16, the linkage 60, the connecting member 52, the door 22 and the pivot pin 44 (plus, optionally, the strut 90, 91 and second mounting point 18, 19 as well).

For example, FIGS. 4A-L show a series of schematic representations of how the various elements of the mechanism 50 act together to convert the linear motion of the actuator 80 into the rotational motion of the door(s) 22. Note that not all of the structure illustrated in FIGS. 1-3 is shown in FIGS. 4A-L, in order to simplify the drawings and make it easier to see the sequence of movements from one drawing to the next. Also, for the sake of simplicity and illustration, only the left side of the structure of FIGS. 1-3 is illustrated. Here in FIGS. 4A-L, filled-in circles represent connection points that are rotatably fixed (i.e., at 19, 44 and 76), and open circles represent connection points that are not fixed (i.e., at $J_1$, $J_2$, $J_3$ and $J_4$). Also note that while no extending/retracting portions 58, 68, 78, 98 are shown in FIGS. 4A-L, these elements may optionally be included. Further, note that some elements are labeled with reference numerals in FIG. 4A (e.g., the arm 30, the connecting member 52, the linkage 60, the lever 70, the strut 91, and various ends thereof 54, 56, 62, 64, 72, 74), but these reference numerals are not repeated throughout FIGS. 4B-L.

Figure 4A:
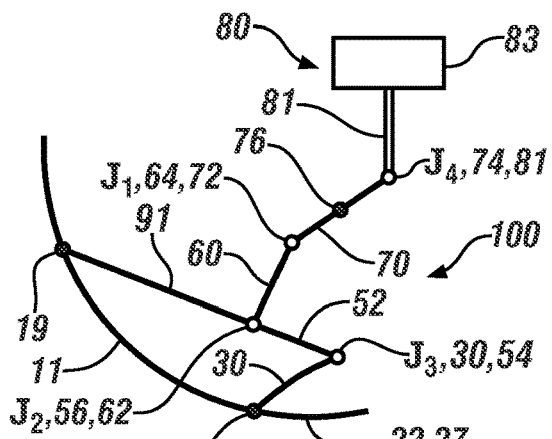
FIGS. 4A-L illustrate a sequence of schematic front views of a landing gear door system, from the closed position through various intermediate positions to the open position, and then from the open position through various other intermediate positions to the closed position.
Figure 4B:
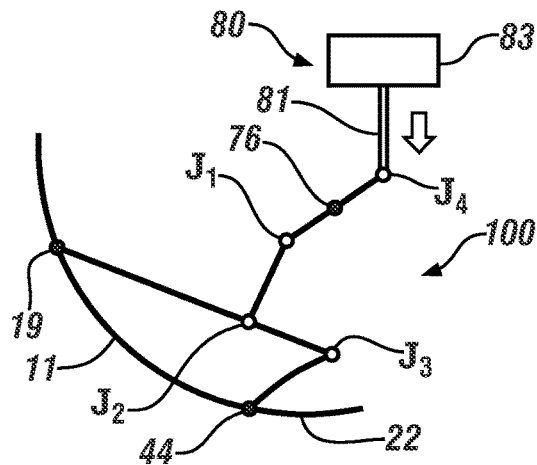
Figure 4C:
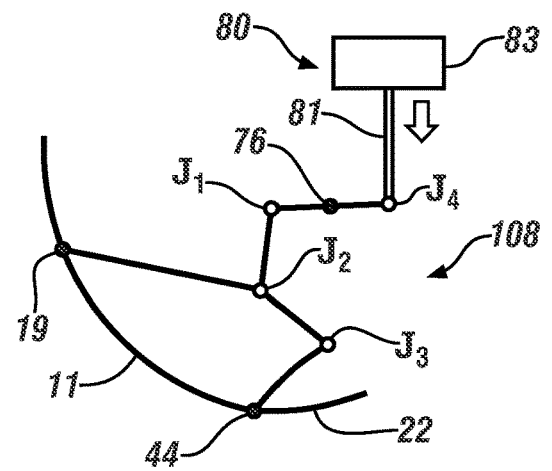
Figure 4D:
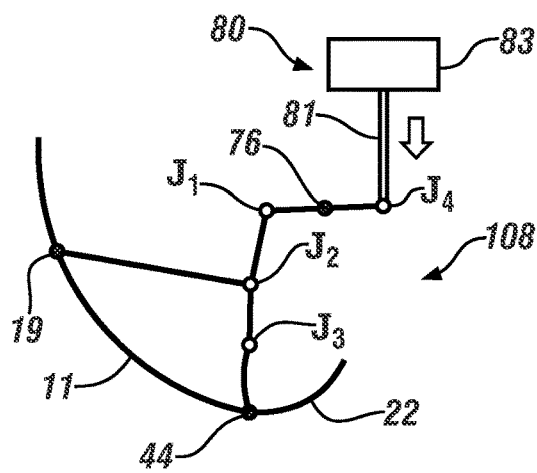

In FIG. 4A, the landing gear door system 20 is in the closed position 100 and the actuator 80 is not causing any motion. In FIG. 4B the actuator 80 just begins to actuate the contact portion 81 downward (as indicated by the downward-pointing arrow), and in FIG. 4C the contact portion 81 has begun pushing downward on the fourth joint $J_4$. Pressing downward on the fourth joint $J_4$ causes the first joint $J_1$ to rotate upward about the fixed fulcrum point 76; likewise, the upward motion of the first joint $J_1$ causes the second joint $J_2$ to also move upward, and causes the third joint $J_3$ to rotate counter-clockwise about the fixed pivot pin 44. FIG. 4D shows the actuator 80 urging further downward motion of the fourth joint $J_4$, which causes further upward motion of the first and second joints $J_1$, $J_2$ and further counter-clockwise rotation of the third joint $J_3$ about the pivot pin 44. In the arrangement shown in FIG. 4D, the overall length of the elements between the first joint $J_1$ and the pivot pin 44 reaches a maximum, and at that point the actuator 80 ceases its downward urging of the fourth joint $J_4$. At this point, the counter-clockwise rotational momentum of the third joint $J_3$ (and the door 22) serves to continue carrying the third joint $J_3$ (and the door 22) in further counter-clockwise rotation about the pivot pin 44, and the actuator 80 then switches from downward urging of the fourth joint $J_4$ to upward urging.

Figure 4E:
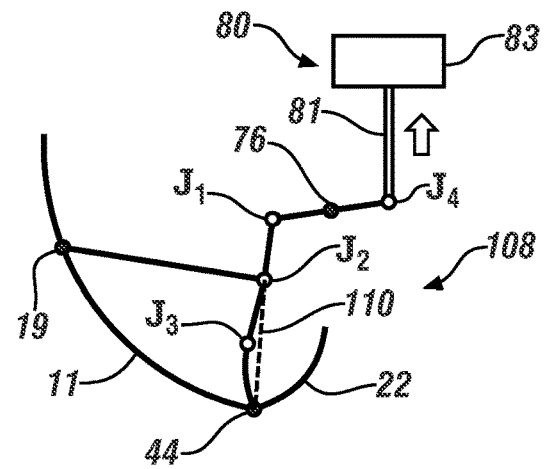
Figure 4F:
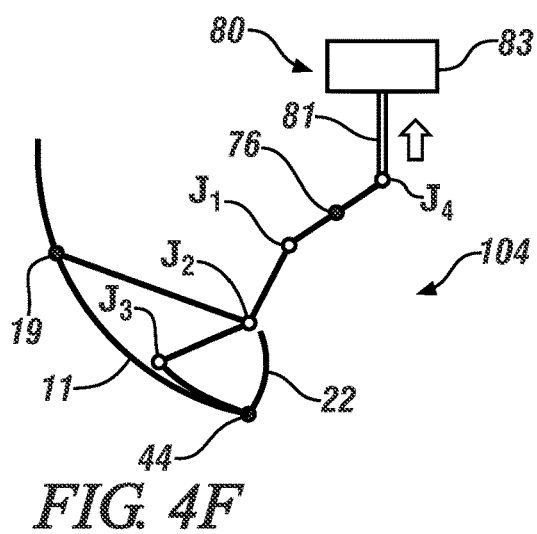
Figure 4G:
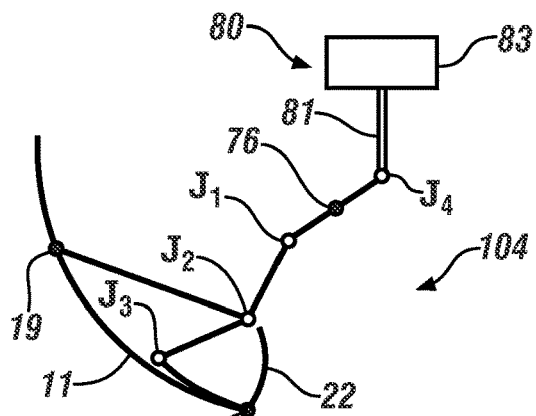

Next, FIG. 4E shows the conflux of three more-or-less simultaneous actions: (i) the continued counter-clockwise motion of the third joint $J_3$ (and the door 22); (ii) the upward urging of the actuator 80 upon the fourth joint $J_4$ (which also causes the first joint $J_1$ to be rotated downward); and (iii) the rightward force exerted by the optional strut 90, 91 upon the second joint $J_2$. This combination of actions promotes further counter-clockwise movement of the third joint $J_3$ (and door 22). Also note that the third joint $J_3$ is disposed outboard of the substantially straight line 110 (as similarly shown in FIG. 3), which also encourages the further counter-clockwise movement of the third joint $J_3$ (and door 22). FIG. 4F illustrates the result of the continued actions and motions of FIG. 4E, with the door 22 now being sufficiently rotated and the opening 106 being fully presented. FIG. 4G shows the actuator 80 ceasing its upward urging, and the landing gear door system 20 being fully in the open position 104. In this position, the landing gear 13 (not shown) may be extended for landing.

Figure 4H:
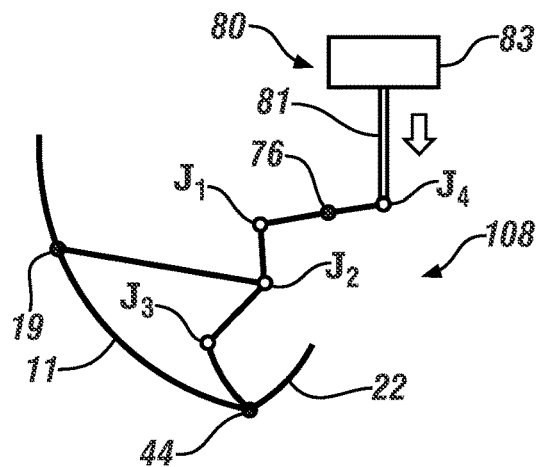
Figure 4I:
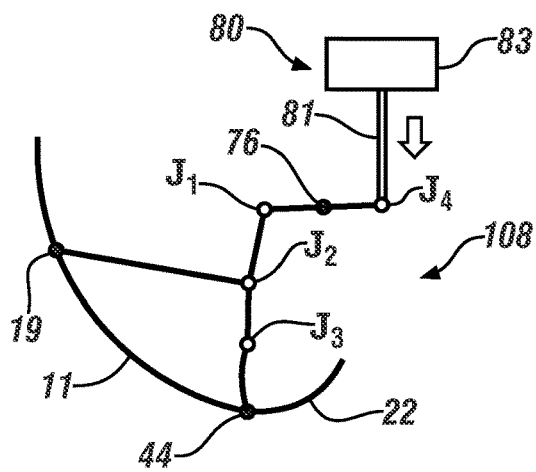
Figure 4J:
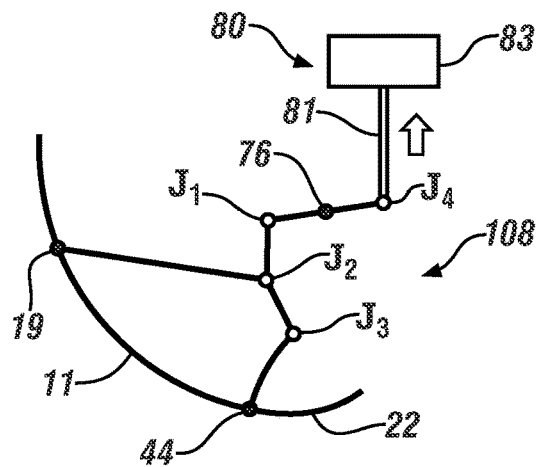
Figure 4K:
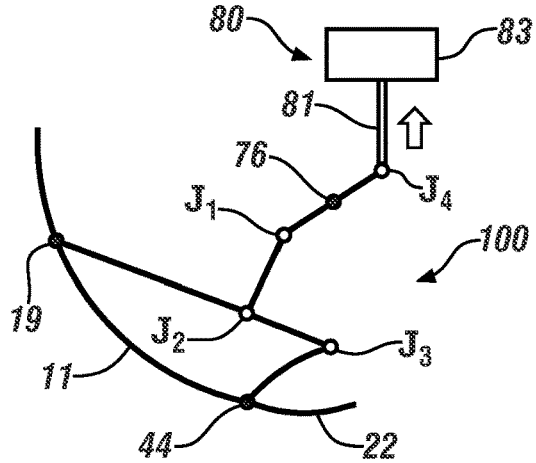
Figure 4L:
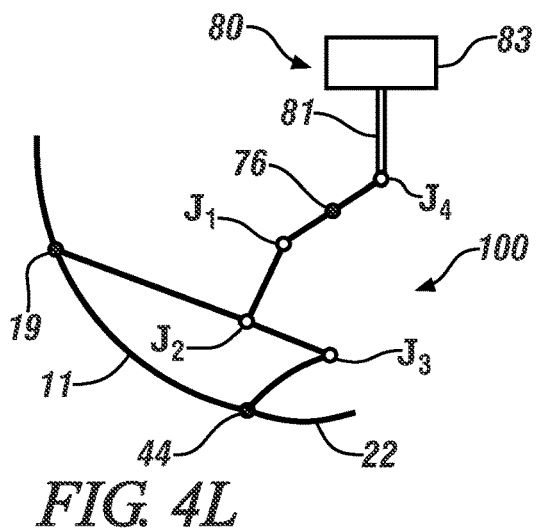

After takeoff, the landing gear 13 may be retracted, and the landing gear door system 20 may move from the open position 104 to the closed position 100. FIG. 4H shows the initiation of this sequence, with the actuator 80 once again urging the fourth joint $J_4$ downward, which causes an upward motion of the first and second joints $J_1$, $J_2$ and a clockwise rotation of the third joint $J_3$ (and door 22) about the pivot pin 44. FIG. 4I illustrates further downward urging by the actuator 80, which causes continued clockwise rotation of the third joint $J_3$ (and door 22). (Note that the arrangement of elements in FIG. 4I is somewhat analogous to the arrangement shown earlier in FIG. 4D.) Then, in FIG. 4J, the actuator 80 ceases its downward urging of the fourth joint $J_4$ and begins an upward urging of the fourth joint $J_4$ (as indicated by the upward-pointing arrow). In FIG. 4K, the actuator 80 continues its upward urging of the fourth joint $J_4$ until the third joint $J_3$ has move clockwise enough to move the door 22 into the closed position 100, at which point the actuator 80 ceases its upward urging of the fourth joint $J_4$ as shown in FIG. 4L. Note that in some instances when the actuator 80 is not urging the fourth joint $J_4$ upward or downward (as in FIGS. 4A, 4G and 4L), the drive portion 83 may act to "lock" the contact portion 81 into its current position, thus keeping the door 22 open (as in FIG. 4G) or closed (as in FIGS. 4A and 4L).

According to another embodiment, a nose landing gear door system 20 for a nose landing gear compartment 12 includes: a door 22 pivotable about a pivot pin 44 configured for disposition in a longitudinal direction 21 on an airframe 10, the door 22 having a door panel 24 rigidly connected with an arm 30 such that the door panel 24 and arm 30 generally form a V-shape 40 as viewed in the longitudinal direction 21; and a mechanism 50 configured for mounting within the nose landing gear compartment 12 and configured to rotate the door 22 about the pivot pin 44 between a closed position 100, in which an outer surface 27 of the door panel 24 is configured to provide aerodynamic continuity 102 with an outer aircraft skin 11 of the airframe 10, and an open position 104, in which the door 22 is rotated into the nose landing gear compartment 12 and an opening 106 is exposed. The mechanism 50 includes: a connecting member 52 having opposed first and second connecting member ends 54, 56, wherein the first connecting member end 54 is pivotably connected to the arm 30; a linkage 60 having opposed first and second linkage ends 62, 64, wherein the first linkage end 62 is pivotably connected to the second connecting member end 56; a lever 70 having opposed first and second lever ends 72, 74 and a fulcrum point 76 between the first and second lever ends 72, 74, wherein the first lever end 72 is pivotably connected to the second linkage end 64 and the fulcrum point 76 is configured for rotatable connection with a first mounting point 16 within the nose landing gear compartment 12; and an actuator 80 rotatably connected to the second lever end 74 and configured for selectively urging the second lever end 74 in a first direction 82 toward the opening 106 and in a second direction 84 away from the opening 106.

At least one of the connecting member 52, the linkage 60, and a portion of the lever 70 between the fulcrum point 76 and the second lever end 74 may be configured to extend and retract in length $L_{52}$, $L_{60}$, $L_{78}$. The nose landing gear door system 20 may further include a strut 90, 91 having opposed first and second strut ends 92, 94, 96, wherein the first strut end 92 is pivotably connected to the first linkage end 62 and the second connecting member end 56, and the second strut end 94, 96 is pivotably connected to one of (i) a second mounting point 18 within the nose landing gear compartment 12 and (ii) the outer aircraft skin 11, 19. The strut 90, 91 may include a strut extender or extending/retracting portion 98 configured for selectively urging or allowing the strut 90, 91 to extend and retract in length $L_{90}$, $L_{91}$. The first lever end 72 and the second linkage end 64 may define a first joint $J_1$ therebetween, the first linkage end 62 and the second connecting member end 56 may define a second joint $J_2$ therebetween, and the first connecting member end 54 and the arm 30 may define a third joint $J_3$ therebetween, wherein when the first and second joints $J_1$, $J_2$ and the pivot pin 44 are disposed along a substantially straight line 110, the third joint $J_3$ is disposed outboard of the substantially straight line 110.

According to yet another embodiment, a nose landing gear door system 20 for an aircraft 15 includes: (a) an airframe 10 having a nose landing gear compartment 12 surrounded by an outer aircraft skin 11; (b) a door 22 pivotable about a pivot pin 44 disposed in a longitudinal direction 21 on the airframe 10, the door 22 having a door panel 24 rigidly connected with an arm 30 such that the door panel 24 and arm 30 generally form a V-shape 40 as viewed in the longitudinal direction 21; and (c) a mechanism 50 mounted within the nose landing gear compartment 12 and configured to rotate the door 22 about the pivot pin 44 between a closed position 100, in which an outer surface 27 of the door panel 24 is configured to provide aerodynamic continuity 102 with the outer aircraft skin 11 of the airframe 10, and an open position 104, in which the door 22 is rotated into the nose landing gear compartment 12 and an opening 106 is exposed. In this embodiment, the mechanism 50 includes: (i) a connecting member 52 having opposed first and second connecting member ends 54, 56, wherein the first connecting member end 54 is pivotably connected to the arm 30; (ii) a linkage 60 having opposed first and second linkage ends 62, 64, wherein the first linkage end 62 is pivotably connected to the second connecting member end 56; (iii) a lever 70 having opposed first and second lever ends 72, 74 and a fulcrum point 76 between the first and second lever ends 72, 74, wherein the first lever end 72 is pivotably connected to the second linkage end 64 and the fulcrum point 76 is rotatably connected with a first mounting point 16 within the nose landing gear compartment 12; and (iv) an actuator 80 rotatably connected to the second lever end 74 and configured for selectively urging the second lever end 74 in a first direction 82 toward the opening 106 and in a second direction 84 away from the opening 106.

In this embodiment, the nose landing gear door system 20 may further include a strut 90, 91 having opposed first and second strut ends 92, 94, 96, wherein the first strut end 92 is pivotably connected to the first linkage end 62 and the second connecting member end 56, and the second strut end 94, 96 is pivotably connected to one of a second mounting point 18 within the nose landing gear compartment 12 and the outer aircraft skin 11, 19. Also in this embodiment, the first lever end 72 and the second linkage end 64 may define a first joint $J_1$ therebetween, the first linkage end 62 and the second connecting member end 56 may define a second joint $J_2$ therebetween, and the first connecting member end 54 and the arm 30 may define a third joint $J_3$ therebetween, wherein when the first and second joints $J_1$, $J_2$ and the pivot pin 44 are disposed along a substantially straight line 110, the third joint $J_3$ is disposed outboard of the substantially straight line 100.

Note that in some configurations of the landing gear door system 20, the orientation and/or positioning of the linkage 60 and the lever 70 (and possibly of the strut 90, 91 as well) may be generally the same for the closed and open positions 100, 104, as may be seen by comparing FIGS. 4A-B and 4K-L (showing the closed position 100) with FIGS. 4F-G (showing the open position 104).

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property.

And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A landing gear door system for a landing gear compartment, comprising:
    a door pivotable about a pivot pin configured for disposition in a longitudinal direction on an airframe, the door having a door panel rigidly connected with an arm such that the door panel and arm generally form a V-shape as viewed in the longitudinal direction; and
    a mechanism configured to rotate the door about the pivot pin between a closed position, in which an outer surface of the door panel is configured to provide aerodynamic continuity with an outer aircraft skin of the airframe, and an open position, in which the door is rotated entirely into the landing gear compartment and an opening is exposed.

2. The landing gear door system of claim 1, wherein the door panel and arm are rigidly connected with each other at a vertex portion of the door, and wherein the pivot pin extends through the vertex portion.

3. The landing gear door system of claim 1, wherein the pivot pin is configured for rotatable connection with one of the outer aircraft skin and a mounting structure within the landing gear compartment.

4. The landing gear door system of claim 1, wherein the mechanism is configured for mounting within the landing gear compartment.

5. The landing gear door system of claim 1, wherein the door panel has an arcuate profile as viewed in the longitudinal direction so as to provide the aerodynamic continuity with the outer aircraft skin in the closed position.

6. The landing gear door system of claim 1, wherein the arm has a curved or bent profile as viewed in the longitudinal direction, wherein the curved or bent profile has an apex which extends away from the door panel.

7. The landing gear door system of claim 1, wherein the mechanism comprises:
    a connecting member having opposed first and second connecting member ends, wherein the first connecting member end is pivotably connected to the arm;
    a linkage having opposed first and second linkage ends, wherein the first linkage end is pivotably connected to the second connecting member end;
    a lever having opposed first and second lever ends and a fulcrum point between the first and second lever ends, wherein the first lever end is pivotably connected to the second linkage end and the fulcrum point is configured for rotatable connection with a first mounting point within the landing gear compartment; and
    an actuator rotatably connected to the second lever end and configured for selectively urging the second lever end in a first direction toward the opening and in a second direction away from the opening.

8. The landing gear door system of claim 7, wherein at least one of the connecting member, the linkage, and a portion of the lever between the fulcrum point and the second lever end is configured to extend and retract in length.

9. The landing gear door system of claim 7, further comprising a strut having opposed first and second strut ends, wherein the first strut end is pivotably connected to the first linkage end and the second connecting member end, and the second strut end is pivotably connected to one of a second mounting point within the landing gear compartment and the outer aircraft skin.

10. The landing gear door system of claim 9, wherein the strut is configured to extend and retract in length.

11. The landing gear door system of claim 10, wherein the strut includes a strut extender configured for selectively urging or allowing the strut to extend and retract in length.

12. The landing gear door system of claim 7, wherein the first lever end and the second linkage end define a first joint therebetween, the first linkage end and the second connecting member end define a second joint therebetween, and the first connecting member end and the arm define a third joint therebetween, and wherein when the first and second joints and the pivot pin are disposed along a substantially straight line, the third joint is disposed outboard of the substantially straight line.

13. A nose landing gear door system for a nose landing gear compartment, comprising:
    a door pivotable about a pivot pin configured for disposition in a longitudinal direction on an airframe, the door having a door panel rigidly connected with an arm such that the door panel and arm generally form a V-shape as viewed in the longitudinal direction; and
    a mechanism configured for mounting within the nose landing gear compartment and configured to rotate the door about the pivot pin between a closed position, in which an outer surface of the door panel is configured to provide aerodynamic continuity with an outer aircraft skin of the airframe, and an open position, in which the door is rotated into the nose landing gear compartment and an opening is exposed, wherein the mechanism comprises:
        a connecting member having opposed first and second connecting member ends, wherein the first connecting member end is pivotably connected to the arm;
        a linkage having opposed first and second linkage ends, wherein the first linkage end is pivotably connected to the second connecting member end;
        a lever having opposed first and second lever ends and a fulcrum point between the first and second lever ends, wherein the first lever end is pivotably connected to the second linkage end and the fulcrum point is configured for rotatable connection with a first mounting point within the nose landing gear compartment; and
        an actuator rotatably connected to the second lever end and configured for selectively urging the second lever end in a first direction toward the opening and in a second direction away from the opening.

14. The nose landing gear door system of claim 13, wherein at least one of the connecting member, the linkage, and a portion of the lever between the fulcrum point and the second lever end is configured to extend and retract in length.

15. The nose landing gear door system of claim 13, further comprising a strut having opposed first and second strut ends, wherein the first strut end is pivotably connected to the first linkage end and the second connecting member end, and the second strut end is pivotably connected to one of a second mounting point within the nose landing gear compartment and the outer aircraft skin.

16. The nose landing gear door system of claim 15, wherein the strut includes a strut extender configured for selectively urging or allowing the strut to extend and retract in length.

17. The nose landing gear door system of claim 13, wherein the first lever end and the second linkage end define a first joint therebetween, the first linkage end and the second connecting member end define a second joint therebetween, and the first connecting member end and the arm define a third joint therebetween, and wherein when the first and second joints and the pivot pin are disposed along a substantially straight line, the third joint is disposed outboard of the substantially straight line.

18. A nose landing gear door system for an aircraft, comprising:
- an airframe having a nose landing gear compartment surrounded by an outer aircraft skin;
- a door pivotable about a pivot pin disposed in a longitudinal direction on the airframe, the door having a door panel rigidly connected with an arm such that the door panel and arm generally form a V-shape as viewed in the longitudinal direction; and
- a mechanism mounted within the nose landing gear compartment and configured to rotate the door about the pivot pin between a closed position, in which an outer surface of the door panel is configured to provide aerodynamic continuity with the outer aircraft skin of the airframe, and an open position, in which the door is rotated into the nose landing gear compartment and an opening is exposed, wherein the mechanism comprises:
  - a connecting member having opposed first and second connecting member ends, wherein the first connecting member end is pivotably connected to the arm;
  - a linkage having opposed first and second linkage ends, wherein the first linkage end is pivotably connected to the second connecting member end;
  - a lever having opposed first and second lever ends and a fulcrum point between the first and second lever ends, wherein the first lever end is pivotably connected to the second linkage end and the fulcrum point is rotatably connected with a first mounting point within the nose landing gear compartment; and
  - an actuator rotatably connected to the second lever end and configured for selectively urging the second lever end in a first direction toward the opening and in a second direction away from the opening.

19. The nose landing gear door system of claim 18, further comprising a strut having opposed first and second strut ends, wherein the first strut end is pivotably connected to the first linkage end and the second connecting member end, and the second strut end is pivotably connected to one of a second mounting point within the nose landing gear compartment and the outer aircraft skin.

20. The nose landing gear door system of claim 18, wherein the first lever end and the second linkage end define a first joint therebetween, the first linkage end and the second connecting member end define a second joint therebetween, and the first connecting member end and the arm define a third joint therebetween, and wherein when the first and second joints and the pivot pin are disposed along a substantially straight line, the third joint is disposed outboard of the substantially straight line.

* * * * *